March 4, 1930.   E. C. HORTON   1,749,429
INDICATING SYSTEM
Filed Aug. 24, 1926
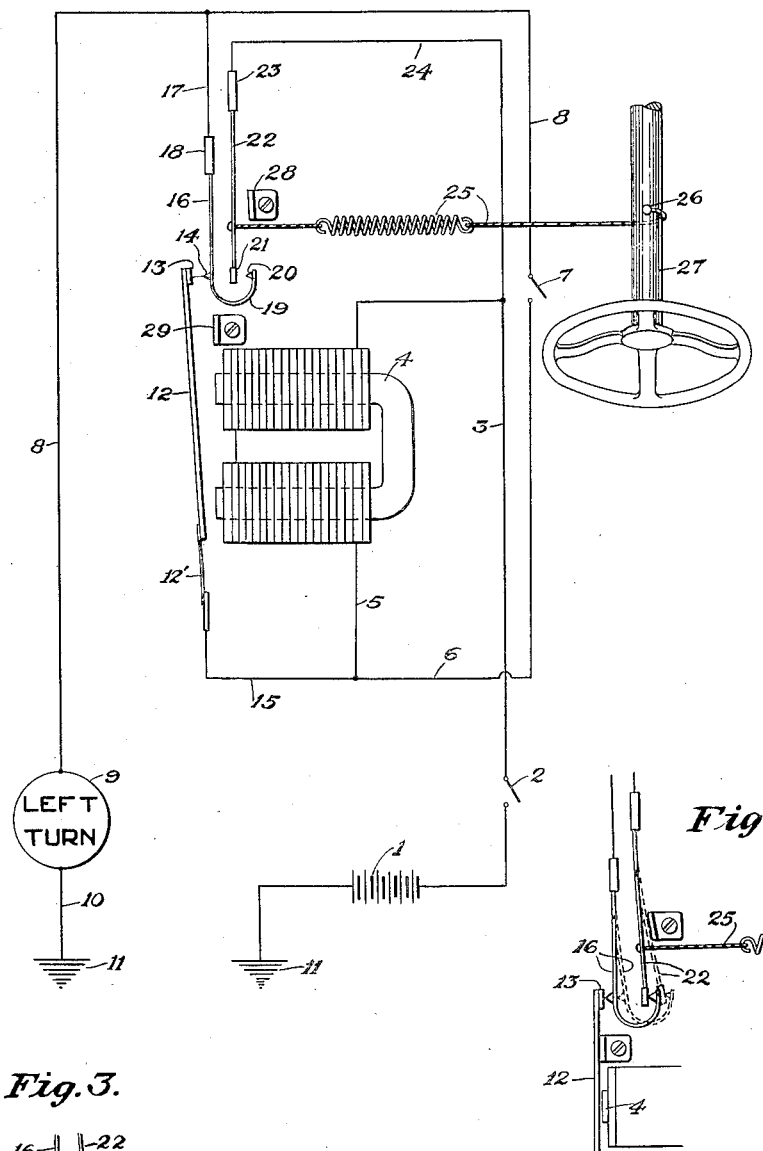
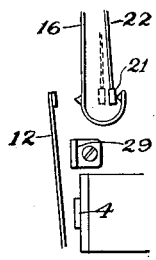
Inventor
Erwin C. Horton
by Barton A. Beanj
Atty.

Patented Mar. 4, 1930

1,749,429

UNITED STATES PATENT OFFICE

ERWIN C. HORTON, OF HAMBURG, NEW YORK, ASSIGNOR TO TRICO PRODUCTS CORPORATION, OF BUFFALO, NEW YORK

INDICATING SYSTEM

Application filed August 24, 1926. Serial No. 131,189.

This invention relates to an electrical indicating system for motor vehicles primarily designed to caution or warn those approaching or trailing the vehicle of an impending change of action about to be made, more especially an intended change in the direction of travel.

The primary objects are to provide a signaling system in which the signaling device may be manually preset to indicate a contemplated variation in the travel of the vehicle, then automatically and electrically interlocked or retained after the manual presetting has been accomplished and until the change has been initiated, when the signaling device is maintained operative by a part of the vehicle which has been moved to effect the desired change of motion and which will automatically restore the signaling device to an inoperative position upon the return of said vehicle part to its normal position; to provide a system of this character which will be substantially free from corrosion and the arcing of the current upon the making and breaking of the several circuits in effecting the several change-overs from the manual presetting to the automatic restoration of the signaling device; and to provide such a signaling system in which the electrical interlock, which comprises an electromagnet, is first shunted by the restoration means and then disconnected from the source of electrical energy.

In the drawings:

Fig. 1 is a view diagrammatically illustrating the improved action signaling system for motor vehicles, Fig. 2 is a detailed view disclosing the change-over about to be made from the retention circuit to the mechanically closed circuit, and depicting in dotted lines the complete interruption of the retention circuit;

Fig. 3 a similar view showing the mechanically closed circuit about to be broken.

Referring more in detail to the drawings, the numeral 1 designates a storage battery, or other suitable source of electrical energy, and 2 the regular ignition switch of a motor vehicle, said switch being connected by circuit wire 3 to an electro-motive device depicted as an electro-magnet 4 and from thence, by circuit wires 5 and 6 to a manually operated presetting switch 7, which may be in the form of a simple push button. From this switch the presetting circuit follows the wire 8, through the signaling device 9, of which there may be several, thence by wire 10 to the ground 11 and back to the source 1. Obviously, by closing the preset switch 7, after the ignition is on, the signal 9 will become operative and the magnet 4 will become energized so that its armature 12 will be attracted to bring its contact point 13 against the contact point 14. With the points 13 and 14 in electrical contact, the magnet will remain energized after the release of the push button 7, the retention circuit shunting the said push button switch, and after passing through the magnet 4 and wire 5 the current flows along wire 15 and armature 12 through the retention switches 13 and 14, along a resilient arm 16 (which supports the contact 14) and by wire 17 to wire 8. This change from the presetting circuit to the retention circuit is almost instantaneous with the closing of the button switch 7, but since the current is flowing through the presetting circuit before and during the closing of contact point 13 on contact point 14 there will be no arcing between these points. The retention circuit shunts the presetting circuit and provides for the maintained energization of the magnet 4 and the continued actuation of the signal 9 subsequent to the release of switch 7 and until the driver of the vehicle initiates his premeditated action when the action circuit will be closed as will now be explained.

The resilient arm 16 is more or less hook-shaped, having its shank suitably anchored at one end, as indicated at 18, and its free end portion extended beyond the contact point 14 and formed with a return bend or loop 19 to support a contact point 20 on the inner side of said loop. Disposed within the loop, in opposition to the contact point 20, is a contact point 21, the same being carried on the free end of an arm 22 suitably fixed, as at 23. This arm is electrically connected by a wire 24 to wire 3, and is mechanically connected to a movable part of the vehicle, as by the elastic link 25. The movable part of the vehicle to which the link is attached is the part which is operated to effect the desired change of action. Thus, if the signal is to indicate that the driver is about to reduce his speed of travel then the elastic connection will be connected to the braking mechanism. In the present instance, the signal indication is one of direction, namely, a left hand turn, and for the purpose of illustration the elastic connection is flexible and secured at 26 to the steering post or shaft 27 to be wound thereon when the same is rotated to effect a left hand turn. Obviously, as the elastic cable 25 is being wound on the steering post a pull is exerted to flex the arm 22 to bring the contact 21 down onto the contact 20 as depicted in solid lines in Fig. 2. Continued winding of the cable will continue further to flex the arm 22 and start to flex the arm 16 is suggested by the dotted line showing in Fig. 2. A stop 28 may be provided to limit the flexure of said arm 22, and a stop 29 may be provided to prevent the armature contacting with the magnet.

In the operation of the signaling system, the driver closes the presetting switch 7 prior to initiating his intended left turn. The closing of this switch closes a presetting circuit through the magnet 4 and the signaling device 9 which actuates the latter and energizes the former. Immediately upon the energization of the magnet the armature 12 is attracted to close the retention circuit through contacts 13 and 14 so that following the momentary closing of said switch 7 the signal will be retained until the turn has been initiated. By this arrangement a sufficient warning may be given before the initiation of the turn or action. Now, when the turn is begun, the pull of the winding cable will bring contact 21 down onto contact 20 to shunt the electro-magnet whereby very little, if any, current will pass through said magnet, the current following the least resistive circuit through wires 3 and 24, arms 22 and 16 and wires 17 and 8 to the signal. Consequently, the magnet may release the armature except for any small amount of current that may still flow through the magnet and which might tend to hold over the armature. To guard against this and to insure the release of the armature, the contact 14 is pulled away from contact 13 to completely interrupt the circuit through said magnet. This is effected by the continued pulling of the elastic connection 25 to flex the arm 16, as above described and as indicated by dotted lines in Fig. 2. The armature will then be permitted to return to its normally inoperative position, under the influence of its resilient support 12'. If now, the steering wheel has to be further rotated so that an additional length of the cable will be wound up, the elasticity of the cable will accommodate the same. As the wheels are again straightened, or returned to their normal forward position, the cable is unwound from the steering post thereby permitting the two flexed, resilient arms 16 and 22 to return to their normal position, the arm 17 arriving at its normal position ahead of arm 22, as shown in Fig. 3. Evidently, the arm 22, still having to return to its normal position as indicated by dotted lines in said view will now break the circuit through contacts 13 and 14 and clear or restore the signaling device to its inoperative position.

If, after the signaling of an intended turn or action, the driver should change his mind and desire to pursue another course he may clear the signal by quickly turning off and on the ignition switch 2, or he may short circuit the magnet by means of a switch (not shown) interposed between and connecting the wires 8 and 24.

From the foregoing it will be gathered that the driver may set his signal by means of a simple push button switch to indicate a premeditated action, and that the signal will remain operative substantially throughout the designated course when the signal will be automatically restored or cleared by the breaking of the circuit at the completion of the course. Furthermore, the retaining magnet is not only short circuited by the closing together of contacts 20 and 21 but the magnet circuit is positively broken by the forced separation of contacts 13 and 14.

What is claimed as new is:

1. In a signaling system for motor vehicles; a presetting circuit comprising a source of electrical energy, an electro-magnet, a manually set switch which opens when released from the hand, and a signaling device all connected in series; a retention circuit interconnected with the first circuit for shunting the manually set switch and comprising an armature for the electro-magnet, and a movable switch part with which said armature, when attracted, normally engages for closing the retention circuit therethrough; and an action circuit closable upon the initiation of the preindicated action and adapted to be opened upon the substantial completion of the preindicated action, said action circuit comprising a switch part movable by and during movement of a part of the vehicle which part is moved to effect the preindicated action, said second switch part first moving into engagement with said first switch part to close the action circuit therethrough and thereby shunt the electromagnet, and then moving said first switch part from electrical contact with said armature for breaking said retention circuit.

2. In a signaling system for motor vehicles; a presetting circuit comprising a source of electrical energy, an electromagnet, a manually set switch which opens when released from the hand, and a signaling device all connected in series; a retention circuit connected in the first circuit for shunting the manually set switch and comprising an armature for the electro-magnet, and a spring arm fixed at one end and having its free end normally engageable by the attracted armature to close the retention circuit; and an action circuit for shunting the first circuit around said electro-magnet and said manually set switch, said action circuit comprising a contact member movable into engagement with and along with said spring arm to close the action circuit, therethrough in shunting relation to the electro-magnet, and an operative connection between said contact member and a movable action accomplishing part of the vehicle for moving said contact member.

3. In a signaling system for vehicles, a presetting circuit including a source of electrical energy, a signaling device, an energizable electrical device, and a self-opening switch, adapted to be closed to indicate an intended action; a retention circuit shunting said switch and including a switch closable by said electrical device when energized, whereby the latter and said signaling device will remain operative when said self-opening switch is inoperative, said second switch having one contact member movable and provided with a hook-like part by which it may be pulled away from the companion contact member to break the circuit, and an action circuit shunting said electrical device and comprising a movable switch member disposed within the hook-like part of said moveable contact member and engageable therewith first to close the action circuit therethrough for shunting said electrical device and then to pull on said movable contact member to break the circuit through said electrical device, and a connection between said movable switch member and a movable part of the vehicle which is moved to effect the desired change of action.

4. In a signaling system for vehicles, a presetting circuit including a source of electrical energy, a signaling device, an energizable electrical device, and a self-opening switch, adapted to be closed to indicate an intended action; a retention circuit shunting said switch and including a switch closable by said electrical device when energized, whereby the latter and said signaling device will remain operative when said self-opening switch is inoperative, and means for mechanically opening said second switch for breaking the retention circuit and holding the signaling device operative during the change of action.

5. In combination, a presetting circuit including a source of electrical energy, an electrically operated device, an energizable electrical device, and a self-opening switch, adapted to be closed to actuate said electrically operated device; a retention circuit shunting said switch and itself including a switch closable by said energizable electrical device when energized, whereby the latter and said electrically operated device will remain operative when said self-opening switch is inoperative; and an action circuit shunting said energizable electrical device and including means for mechanically opening said second switch, said means acting to close said action circuit for first shunting said energizable electrical device and then opening said second switch to break said retention circuit.

6. In combination, a retention circuit including a source of electrical energy, an electrically operated device, an electro-magnet including its armature, and a switch closable upon the attraction of said armature by the electro-magnet when energized; a second circuit including a switch, one part of which is mechanically connected to a movable part of the first switch, said second circuit shunting the electro-magnet with its armature and including said source of electrical energy and said electrically operated device, and means for successively closing said second switch and then, by a continued movement, moving said movable part of the first switch to break said retention circuit, said retention circuit being initially closable by and during movement of said armature to its attracted position.

7. In a signaling system for vehicles, a presetting circuit including a source of electrical energy, a signaling device, an energizable electrical device, and a presetting switch, adapted to be closed to indicate an intended action; a retention circuit shunting said switch and including a switch closable by said electrical device when energized, said second switch having one contact member movable and provided with a part by which it may be moved away from the companion contact member to break the circuit; and an action circuit shunting said electrical device and comprising a movable switch member engageable with said part first to close the action circuit therethrough for shunting said electrical device and then to move said movable contact member to break the circuit through said electrical device, and a connection between said movable switch member and a movable part of the vehicle which is moved to effect the desired change of action.

ERWIN C. HORTON.